United States Patent
Delmonte

[15] 3,656,907
[45] Apr. 18, 1972

[54] MODIFIED KARL FISCHER REAGENT

[72] Inventor: Clive Stephen Delmonte, 12 High Road, Buckhurst Hill, England

[22] Filed: July 2, 1970

[21] Appl. No.: 52,009

[30] Foreign Application Priority Data

July 14, 1969 Great Britain......................35,246/69
Dec. 6, 1969 Great Britain......................59,701/69
Feb. 20, 1970 Great Britain........................8,347/70
Mar. 18, 1970 Great Britain......................13,126/70

[52] U.S. Cl. ..........................................23/230 R, 252/408
[51] Int. Cl....................................C09k 3/00, G01n 33/18
[58] Field of Search....................................23/230; 252/408

[56] References Cited

UNITED STATES PATENTS 2,780,601 2/1957 Blomgren et al........................252/408
2,967,155 1/1961 Blomgren et al. ................23/230 R X

*Primary Examiner*—Morris O. Wolk
*Assistant Examiner*—R. M. Reese
*Attorney*—Woodhams, Blanchard and Flynn

[57] ABSTRACT

A modified Karl Fischer reagent containing, as the reducing agent, a sulphoxide or an organic nitrite of relatively low vapor pressure, and a base which is not pyridine but is a substantially odorless base containing the pyridine skeleton.

12 Claims, No Drawings

MODIFIED KARL FISCHER REAGENT

The invention relates to a reagent effective to determine, chemically, small quantities of water in various substances.

It is known that small quantities of water in various substances may be determined chemically with Karl Fischer reagent. The use of such reagent is of particular value where the common physical methods are inapplicable, especially for the determination of small percentages of water in certain liquids and in certain volatile solids.

Karl Fischer reagent is composed essentially of iodine and sulphur dioxide in pyridine/methanol solution, and its reaction with water, represented in a simple form, is as follows:

$$H_2O + SO_2 + I_2 + 3C_5H_5N = 2C_5H_5N \cdot HI + C_5H_5N \cdot SO_3$$

and $$C_5H_5N \cdot SO_3 + CH_3OH = CH_3(C_5H_5NH) \cdot SO_4$$

So formulated, the reagent has several disadvantages. Thus the reagent is highly malodorous and its vapor is toxic. Pyridine vapor is carcinogenic and sulphur dioxide vapor is now known to cause genetic defects. The reagent is hygroscopic and is attacked by oxygen, and consequently it deteriorates on exposure to the atmosphere. The reagent thus requires to be handled under dry nitrogen or other dry, inert gas. The reagent is also sensitive to light and tends to age rapidly even in comparative darkness.

It is an object of the invention to provide a modified reagent of the Karl Fischer type in which one or more of the foregoing disadvantages are mitigated.

According to the invention, the reagent contains a reducing agent other than sulphur dioxide and, instead of pyridine, a substantially odorless organic base of relatively low volatility.

The reducing agent, which replaces the sulphur dioxide of the Karl Fischer reagent, suitably has a relatively low vapor pressure at room temperature (20° C) and is advantageously a sulphoxide or an organic nitrite. The preferred sulphoxides are dialkyl sulphoxides in which each alkyl group contains not more than four carbon atoms, particularly dimethyl sulphoxide (DMSO). In the spent reagent, the sulphoxide is oxidized to the sulphone. Suitable nitrites include alkyl nitrites containing at least four carbon atoms in the alkyl group, the preferred nitrites being the butyl and amyl nitrites, for example, n-butyl, isobutyl, n-amyl and isoamyl nitrites. The equation of the reaction with water of the reagent containing a nitrite is as follows:

$$RNO_2 + H_2O + I_2 + 2 \cdot Base \rightarrow$$
$$RNO_3 + 2I^- + 2(Base \cdot H)^+$$

The base, which has a relatively low vapor pressure at room temperature (20° C), preferably contains the pyridine nucleus or skeleton and it may be a solid or a high-boiling liquid, for example, a liquid having a boiling point in the range 150°–300° C. The base may be a bipyridyl, a polypyridyl, a biquinolyl, a 2-(pyridyl)-propane-(1,3)-diol or a 2-(pyridyl)-tertiary butane-(1,3,4)-triol, for example the 2'-pyridyl compounds. These hydroxylic bases are amongst the preferred bases for use in the reagent according to the invention; they may be prepared by the method described by Lipp and Zirngibl, Chemische Berichte (1906), 39, 1045–1054.

The oxidizing agent in the reagent is preferably iodine. However, a part of the iodine may be replaced by a compound of a polyvalent metal in a higher state of oxidation, for example a ferric or cupric compound, suitably ferric thiocyanate or anhydrous cupric salicylate. The mode of action of a reagent containing oxidizing ions of a metal $(M_1)$ of charge $n$ is as follows:

$$H_2O + DMSO + I_2 + 2 \cdot Base = DMSO_2 + 2 \cdot (Base \cdot H)^+ + 2I^-$$
$$2M_1{}^n + 2I^- = 2M_1{}^{n-1} + I_2$$

A preferred reagent contains, per liter, 0.05–1.0 mole free iodine or an equivalent amount of a mixture of free iodine and a compound of a metal in a high oxidation state; 0.1–2.0 moles of a sulphoxide or nitrite, particularly dimethyl sulphoxide, butyl nitrite or amyl nitrite; and 0.1–4.0 moles of a substantially odorless organic base of low volatility, particularly a base incorporating a pyridine nucleus.

The solvent used in the reagent is preferably a hydroxylic compound, particularly methanol. Other suitable solvents include ethanol, ethylene glycol, diethylene glycol and dioxan.

The reagent may, when necessary, include a compound effective as a catalyst to promote the reaction of the reagent with water. The catalytic compound is preferably a strong organic base, a suitable catalyst being N-ethylpiperidine. Tri-n-butylamine is also a suitable catalyst. When a catalyst is used, it may be added to the sample under test rather than directly to the reagent.

To mitigate or prevent oxidation of the reagent and to hinder hygroscopic absorption of water by the reagent, the reagent may be provided with a protective, surface film. Preferred surface films of this kind may be formed by (1) normally liquid silicones having a viscosity which is preferably below 3 centistokes and/or a specific gravity preferably below 0.90, or a methyl phenyl silicone preferably below 100 centistokes, or (2) a surfactant of low solubility in the reagent solvent, the preferred surfactants being long chain alkylbenzene sulphonates.

The presence of certain ions, typically $K^+$, $Na^+$, $Sr^{+2}$, $Co^{+2}$, $Zn^{+2}$ and $I^-$, in varying degrees, catalyze, accelerate or promote the reaction, stabilize the reagent and improve its end-point and one or more of them may be included in the reagent. The metal ions may, for example, be introduced as acetates and the iodide ion as, for example, pyridinium iodide or potassium iodide. Certain indicators, widely used in non-aqueous chemistry, can be added to the reagent, or to the sample under test, to sharpen the end-point, especially if the end-point at a particular pH is required. Suitable indicators include acridine and thymol blue.

The reagent according to the invention can be used to determine the water content of miscellaneous substances, in the manner known with the Karl Fischer reagent. Typical examples of such use include the determination of the water content (a) of oils, fats and greases; (b) of wheat and of foodstuffs generally; and (c) of organic and inorganic hydrates. The reagent may also be used to determine the rate of a chemical reaction when water is generated in that reaction.

It will be understood that the invention also includes the use of the reagent in the determination of the water content of substances.

The invention is illustrated in the following examples.

EXAMPLE 1

The reagent consisted of a solution in methanol of

| | |
|---|---|
| Dimethyl sulphoxide | 25 g per liter |
| Iodine | 75 g per liter |
| Bipyridyl (an unresolved mixture of isomers, including the 2–2' and 2–3' isomers) | 50 g per liter |
| N-ethylpiperidine | 25 ml per liter |

A droplet of a methyl phenyl silicone having a viscosity at 25° C of about 80 centistokes was added to a liter of the reagent to form a surface film.

EXAMPLE 2

The reagent had the same composition as in Example 1 except that the catalyst, N-ethylpiperidine, was omitted. When necessary, an appropriate amount of the catalyst was added to the reaction vessel in which the water content of the sample under test was being determined.

EXAMPLE 3

The reagent had the same composition as in Example 1 except that the catalyst was tri-n-butylamine.

EXAMPLE 4

The reagent consisted of a solution in methanol of

| | |
|---|---|
| Butyl nitrite | 30 g per liter |
| Iodine | 75 g per liter |
| 2-(2'-pyridyl)-t-butane-(1,3,4)-triol | 105 g per liter |
| N-ethylpiperidine | 25 ml per liter |

EXAMPLE 5

The reagent consisted of the methanol solution specified in Example 4 but there was added to 1 liter of the solution a drop of a silicone to form a protective, surface film.

EXAMPLES 6a - 6d

Four reagents were produced corresponding, respectively, to the reagents of Examples 1, 2, 3 and 5 except that the silicone surface film was replaced by a film of sodium dodecylbenzene sulphonate.

I claim:

1. In a reagent of the Karl Fischer type for the determination of small quantities of water in various substances, the improvement in which (1) the reducing agent is a member of the group consisting of sulphoxides and organic nitrites of relatively low vapor pressure at 20° C and (2) the base is not pyridine but is a substantially odorless base containing the pyridine skeleton and having a relatively low vapor pressure at 20° C.

2. A reagent according to claim 1, in which the reducing agent is a member of the group consisting of dimethyl sulphoxide, butyl nitrites and amyl nitrites.

3. A reagent according to claim 2, in which the said base is a member of the group consisting of bipyridyls, polypyridyls, biquinolyls, 2-(pyridyl)-propane-(1,3)-diols and 2-(pyridyl)-tertiary butane-(1,3,4)-triols.

4. A reagent according to claim 3 including, as oxidizing agent, a mixture of free iodine and a compound of a polyvalent metal in a higher state of oxidation.

5. A reagent according to claim 4, in which said polyvalent metal compound is a member of the group consisting of ferric and cupric compounds.

6. A reagent according to claim 3, including free iodine as oxidizing agent.

7. A reagent according to claim 6, containing 0.05–1.0 mole per liter of free iodine, 0.1–2.0 moles per liter of reducing agent and 0.1–4.0 moles per liter of said base.

8. A reagent according to claim 7, in which the solvent is methanol.

9. A reagent according to claim 7, including a catalytic amount of a substance effective to promote the reaction of the reagent with water, said substance being a strong, organic base.

10. A reagent according to claim 7, including a surface film effective to mitigate aerial oxidation of the reagent and hygroscopic absorption of water by the reagent.

11. A reagent according to claim 10, in which the surface film is formed by a member of the group consisting of normally liquid silicones and surfactants of low solubility in organic, hydroxylic solvent.

12. A process of determining small quantities of water in various substances by the Karl Fischer method in which the reagent employed is that claimed in claim 1.

* * * * *